United States Patent
Aso et al.

(10) Patent No.: US 10,594,184 B2
(45) Date of Patent: Mar. 17, 2020

(54) STATOR, METHOD OF MANUFACTURING STATOR, MOTOR, AND AIR CONDITIONING APPARATUS

(71) Applicant: Mitsubishi Electric Corporation, Tokyo (JP)

(72) Inventors: Hiroki Aso, Tokyo (JP); Tomoaki Oikawa, Tokyo (JP); Mineo Yamamoto, Tokyo (JP); Hiroyuki Ishii, Tokyo (JP); Junichiro Oya, Tokyo (JP); Yuto Urabe, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 122 days.

(21) Appl. No.: 15/760,011

(22) PCT Filed: Dec. 16, 2015

(86) PCT No.: PCT/JP2015/085159
§ 371 (c)(1),
(2) Date: Mar. 14, 2018

(87) PCT Pub. No.: WO2017/104013
PCT Pub. Date: Jun. 22, 2017

(65) Prior Publication Data
US 2018/0254682 A1 Sep. 6, 2018

(51) Int. Cl.
*H02K 1/18* (2006.01)
*H02K 3/52* (2006.01)
(Continued)

(52) U.S. Cl.
CPC .......... *H02K 3/525* (2013.01); *F25B 31/026* (2013.01); *H02K 1/146* (2013.01); *H02K 1/18* (2013.01);
(Continued)

(58) Field of Classification Search
CPC ........... H02K 1/18; H02K 5/08; H02K 3/522; H02K 15/02; H02K 15/04; H02K 15/026; H02K 15/12
See application file for complete search history.

(56) References Cited

U.S. PATENT DOCUMENTS

| 5,801,205 A | 9/1998 | Nishibori et al. |
| 2004/0134566 A1* | 7/2004 | Iyoda .................. H01F 1/14741 148/105 |

(Continued)

FOREIGN PATENT DOCUMENTS

| CN | 104836395 A | 8/2015 |
| JP | 05-096540 A | 4/1993 |

(Continued)

OTHER PUBLICATIONS

International Search Report dated Mar. 22, 2016 issued in corresponding international patent application No. PCT/JP2015/085159.
(Continued)

*Primary Examiner* — Dang D Le
(74) *Attorney, Agent, or Firm* — Posz Law Group, PLC

(57) ABSTRACT

The stator includes a stator core having a first tooth and a second tooth adjacent to each other, a coil having a first winding portion wound around the first tooth and a second winding portion wound around the second tooth, a resin chip disposed in in a gap between the first winding portion and the second winding portion, and a molding resin covering the stator core, the coil, and the resin chip.

16 Claims, 11 Drawing Sheets

(51) Int. Cl.
*H02K 15/12* (2006.01)
*F25B 31/02* (2006.01)
*H02K 1/14* (2006.01)
*H02K 3/18* (2006.01)
*H02K 3/32* (2006.01)
*H02K 15/00* (2006.01)
*H02K 15/02* (2006.01)
*H02K 15/095* (2006.01)
*H02K 15/10* (2006.01)

(52) U.S. Cl.
CPC .............. *H02K 3/18* (2013.01); *H02K 3/325* (2013.01); *H02K 15/0068* (2013.01); *H02K 15/022* (2013.01); *H02K 15/095* (2013.01); *H02K 15/105* (2013.01); *H02K 15/12* (2013.01); *H02K 2203/06* (2013.01)

(56) References Cited

U.S. PATENT DOCUMENTS

2006/0006749 A1* 1/2006 Sasaki ................. B62D 5/0406
                                                            310/68 R
2015/0229192 A1   8/2015 Yoshida et al.
2016/0065040 A1*  3/2016 Nagai .................... H02K 15/12
                                                            264/40.7

FOREIGN PATENT DOCUMENTS

| JP | 09-066527 A | 3/1997 |
| JP | 10-156862 A | 6/1998 |
| JP | 10-271720 A | 10/1998 |
| JP | 11-041869 A | 2/1999 |
| JP | 2000-166195 A | 6/2000 |
| JP | 2003-244880 | 8/2003 |
| JP | 2008-174629 A | 7/2008 |
| JP | 2008-199806 A | 8/2008 |

OTHER PUBLICATIONS

Office action dated Jul. 2, 2019 issued in corresponding CN patent application No. 201580085153.3 (and English ranslation thereof).

* cited by examiner

STATOR, METHOD OF MANUFACTURING STATOR, MOTOR, AND AIR CONDITIONING APPARATUS

CROSS REFERENCE TO RELATED APPLICATION

This application is a U.S. national stage application of PCT/JP2015/085159 filed on Dec. 16, 2015, the contents of which are incorporated herein by reference.

TECHNICAL FIELD

The present invention relates to a stator for use in a motor, a method of manufacturing the stator, the motor, and an air conditioning apparatus using the motor.

BACKGROUND ART

A stator of a molded motor is manufactured by winding a coil around a stator core and integrally molding the coil and the stator core using a molding resin. In recent years, reduction of the amount of use of the molding resin is required in order to reduce manufacturing cost.

Accordingly, a technique is proposed in which a resin thermally cured in a runner of a mold in previous molding is placed in a cavity of the mold in next molding so that the resin is integrated with a molding resin injected into the cavity (see, for example, Patent Reference 1).

Moreover, another technique is proposed in which a ring shaped groove is provided at an axial end surface of a stator so as to reduce the amount of use of a molding resin by an amount corresponding to a volume of the groove (see, for example, Patent Reference 2).

PRIOR ART REFERENCE

Patent Reference

Patent Reference 1: Japanese Patent Application Publication No. 2000-166195 (see FIG. 1)
Patent Reference 2: Japanese Patent Application Publication No. H10-271720 (see paragraph 0028)

SUMMARY OF THE INVENTION

Problem to be Solved by the Invention

In recent years, however, further reduction of the amount of use of the molding resin is required in order to further reduce manufacturing cost.

The present invention is intended to solve the above described problem, and an object of the present invention is to reduce the amount of use of the molding resin.

Means of Solving the Problem

A stator according to the present invention includes a stator core having a first tooth and a second tooth adjacent to each other, a coil having a first winding portion wound around the first tooth and second winding portion wound around the second tooth, a resin chip disposed in a gap between the first winding portion and the second winding portion, and a molding resin covering the stator core, the coil and the resin chip.

A motor according to the present invention includes a stator and, a rotor disposed inside the stator. The stator includes a stator core having a first tooth and a second tooth adjacent to each other, a coil having a first winding portion wound around the first tooth and a second winding portion wound around the second tooth, a resin chip disposed in a gap between the first winding port on and the second winding portion, and a molding resin covering the stator core, the coil and the resin chip.

An air conditioning apparatus according to the present invention includes an outdoor unit having a first fan and a first motor to drive the first fan, an indoor unit having a second fan and a second motor to drive the second fan, and a refrigerant pipe connecting the outdoor unit and the indoor unit. At least one of the first motor and the second motor has a stator and a rotor disposed inside the stator. The stator includes a stator core having a first tooth and a second tooth adjacent to each other, a coil having a first winding portion wound around the first tooth and a second winding portion wound around the second tooth, a resin chip disposed in a gap between the first winding portion and the second winding portion, and a molding resin covering the stator core, the coil and the resin chip.

A method of manufacturing a stator according to the present invention includes the steps of preparing a stator core having a first tooth and a second tooth adjacent to each other, winding a first winding portion of a coil around the first tooth and winding a second winding portion of the coil around the second tooth, supplying a resin chip into a gap between the first winding portion and the second winding portion, and integrally molding the stator core, the coil and the resin chip using a molding resin.

Effects of the Invention

According to the present invention, since the resin chip is disposed in the gap between the first winding portion and the second winding portion of the coil, the amount of use of the molding resin can be further reduced, and thereby manufacturing cost can be further reduced.

DETAILED DESCRIPTION OF THE INVENTION

First Embodiment

Figure 1:
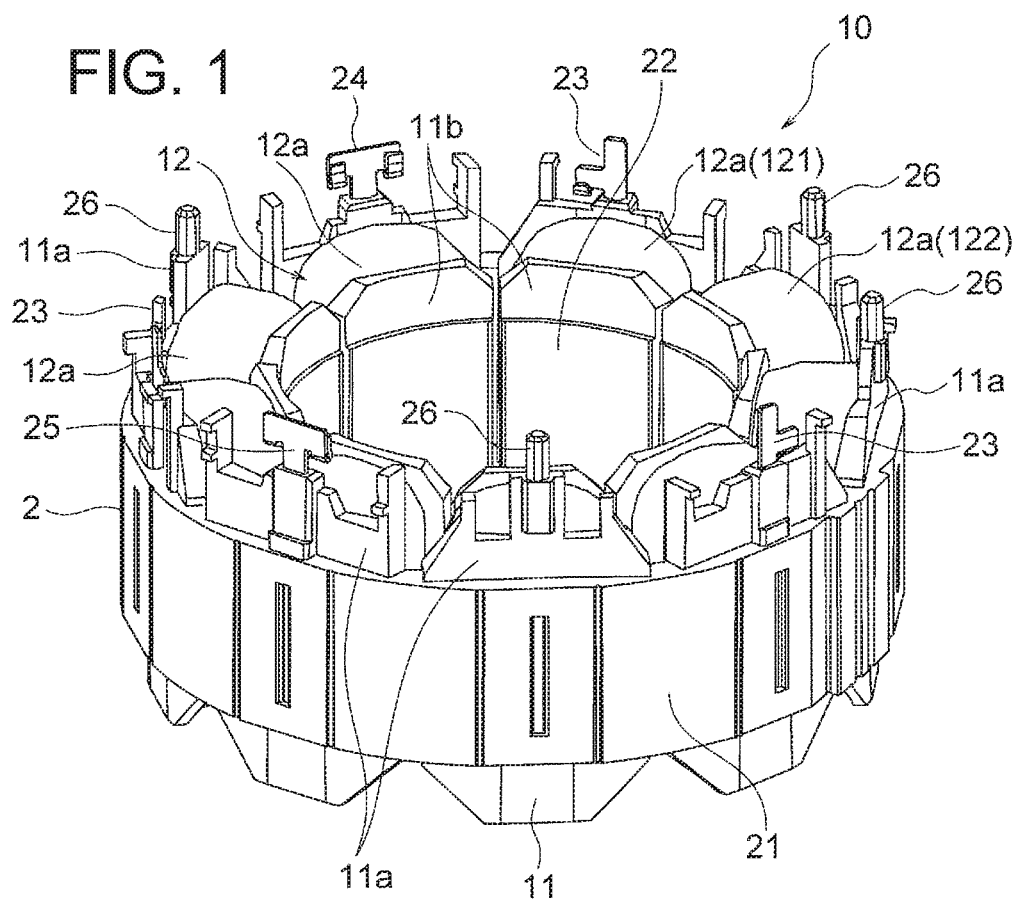
FIG. 1 is a perspective view illustrating a structure of a stator assembly of a first embodiment of the present invention.

FIG. 1 is a perspective view illustrating a structure of a stator assembly 10 according to a first embodiment of the present invention. The stator assembly 10 constitutes a stator 1 (FIG. 9) of a motor 100 (FIG. 10) described later. As illustrated in FIG. 1, the stator assembly 10 includes a stator core 2, an insulating portion (an insulator) 11 provided on the stator core 2, and a coil 12 wound around the stator core 2 via the insulating portion 11.

Figure 2:
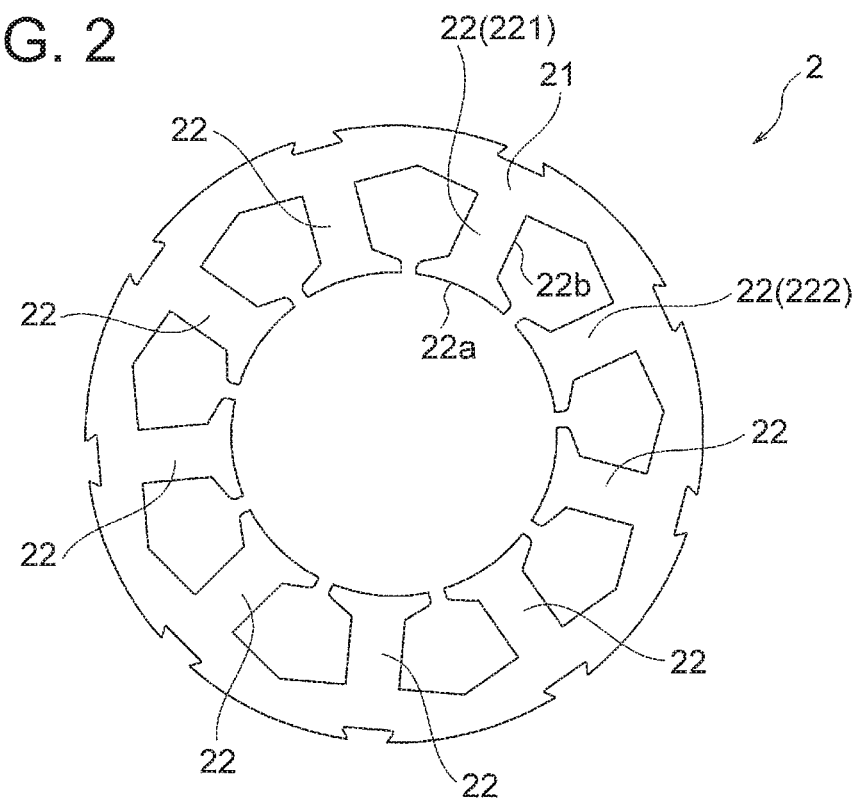
FIG. 2 is a plan view illustrating a structure of a stator core of the first embodiment.

FIG. 2 is a plan view illustrating a structure of the stator core 2. The stator core 2 is formed in an annular shape as a whole. The stator core 2 includes a yoke 21 constituting an outer circumferential portion and a plurality of teeth 22 extending radially inward from the yoke 21. A slot is formed between the teeth 22 adjacent to each other. Nine teeth 22 are arranged at equal intervals in a circumferential direction of the stator core in this example, but the number of the teeth 22 is not specifically limited. For example, among the plurality of teeth 22 of the stator core 2, any two teeth 22 that are adjacent to each other in the circumferential direction are referred to as a first tooth 221 and a second tooth 222.

In the following description, a direction of a center axis of the annular stator core 2 is referred to as an axial direction of the stator core 2 (or an axial direction of the stator assembly 10). Moreover, a direction along an outer circumference (a circumference of a circle) of the stator core 2 is referred to as a circumferential direction of the stator core 2 (or a circumferential direction of the stator assembly 10).

The tooth 22 includes an inner circumferential end 22a on a side opposite to the yoke 21. Moreover, the tooth 22 includes coil holding surfaces 22b around which the coil 12 (FIG. 1) is wound. The stator core 2 is covered with the insulating portion 11 (FIG. 1) except for the inner circumferential ends 22a of the teeth 22 and an outer circumferential surface of the yoke 21. This insulating portion 11 insulates the stator core 2 and the coil 12 from each other.

The stator core 2 is obtained by stacking a plurality of electromagnetic steel sheets punched into strip shapes and then by fixing the stacked electromagnetic steel sheets with each other by caulking, welding, or bonding. In this example, the stator core 2 has a structure in which the stator core 2 is divided into a plurality of blocks, and the number of the blocks (nine in this example) is equal to the number of the teeth 22.

Before the stator core 2 is assembled into an annular shape, the stator core 2 is in the form of a strip-shaped connecting body in which the nine blocks are connected with each other in a row. The insulating portion 11 is integrally molded with or assembled to the strip-shaped connecting body, the coil 12 (a magnet wire) is wound around each tooth 22, and then ends of the strip-shaped connecting body are welded with each other. In this manner, the annular stator core 2 illustrated in FIG. 2 is formed. In this regard, the stator core 2 is not limited to a structure in which the stator core 2 is divided into a plurality of blocks.

Referring back to FIG. 1, the insulating portion 11 is formed by integrally molding a thermoplastic resin such as polybutylene terephthalate (PBT) with the stator core 2, or by attaching a molded body of a thermoplastic resin preliminarily molded to the stator core 2.

The insulating portion 11 includes portions covering the coil holding surfaces 22b (FIG. 2) of the teeth 22, an outer wall portion 11a supporting the coil 12 to prevent the coil 12 from falling outward, and an inner wall portion 11b supporting the coil 12 to prevent the coil 12 from falling inward. The outer wall portion 11a and the inner wall portion 11b of the insulating portion 11 are formed to protrude from the coil 12 on both sides (both of top and bottom sides in FIG. 1) of the stator assembly 10 in the axial direction.

The coil 12 is formed by winding, for example, magnet wires around the teeth 22. Portions of the coil 12 wound around the teeth 22 are referred to as winding portions 12a. For example, the winding portion 12a wound around the first tooth 221 illustrated in FIG. 2 is referred to as a first winding portion 121, and the winding portion 12a wound around the second tooth 222 is referred to as a second winding portion 122.

The coil 12 is formed of three-phase windings. Three power terminals 23 and two neutral point terminals 24 and 25 to which parts of the coil 12 of respective phases (U-phase, V-phase, and W-phase) are connected are attached to the outer wall portion 11a of the insulating portion 11.

The parts of the coil 12 of the respective phases (U-phase, V-phase, and W-phase) are joined to the power terminals 23 and the neutral point terminals 24 and 25 by fusing (thermal caulking), soldering or the like. In this regard, detailed description of connection between the parts of the coil 12 of the respective phases and the power terminals 23 and the neutral point terminals 24 and 25 is omitted.

In this regard, in the axial direction of the stator core 2, a side on which the power terminals 23 and the neutral point terminal 24 are provided (an upper side in FIG. 1) is referred to as a connection side, and its opposite side (a lower side in FIG. 1) is referred to as a counter-connection side.

A plurality of (four in this example) pins 26 for fixing a lead wire wiring component 3 (FIG. 3) are formed to protrude from the outer wall portion 11a of the insulating portion 11. Moreover, a plurality of projections 11c (FIG. 10) for positioning the stator assembly 10 with respect to a molding mold described later are provided on an end portion of the inner wall portion 11b on the counter-connection side.

Figure 3:
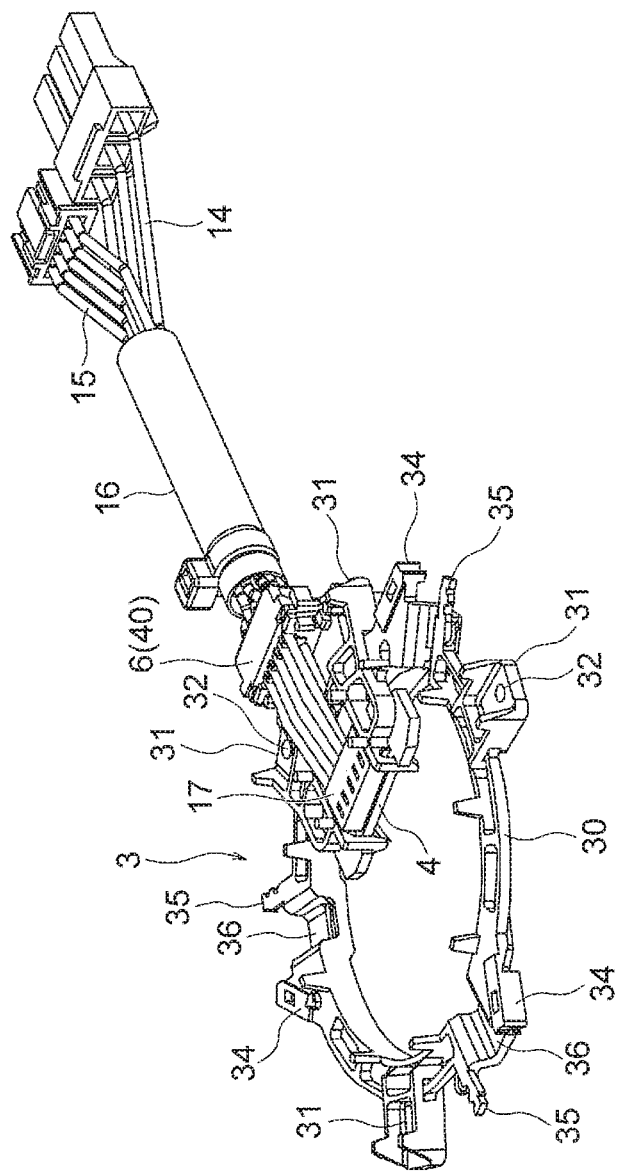
FIG. 3 is a perspective view illustrating a structure of a lead wire wiring component of the first embodiment.

Next, the lead wire wiring component 3 as a wiring component will be described. The lead wire wiring component 3 is attached to the connection side of the stator assembly 10 (obtained by attaching the insulating portion 11 and the coil 12 to the stator core 2). FIG. 3 is a perspective view of the lead wire wiring component 3 as viewed from a side opposite to the stator assembly 10.

Power lead wires 14 and sensor lead wires 15 are attached to the lead wire wiring component 3. In this example, three power lead wires 14 and five sensor lead wires 15 are collected in a bundle and constitute a lead wire group 16. A board-in connector 17 is attached to tips (ends on the lead wire wiring component 3 side) of the sensor lead wires 15.

The lead wire wiring component 3 is composed of a thermoplastic resin such as PBT, and includes an annular plate portion 30 to be attached to the stator assembly 10. The annular plate portion 30 includes a plurality of (four in this example) leg portions 31 that contact an upper surface of the outer wall portion 11a (FIG. 1) when the lead wire wiring component 3 is attached to the stator assembly 10. The leg portions 31 are formed to protrude further radially outward from an outer circumference of the annular plate portion 30. The leg portions 31 have holes 32 that engage with the pins 26 (FIG. 1) of the stator assembly 10.

The leg portions 31 contact the upper surface of the outer wall portion 11a, and thus an axial position of the lead wire wiring component 3 relative to the stator assembly 10 is determined. Moreover, the pins 26 of the stator assembly 10 engage with the holes 32 of the leg portions 31, and thus a circumferential position of the lead wire wiring component 3 is determined.

Figure 4:
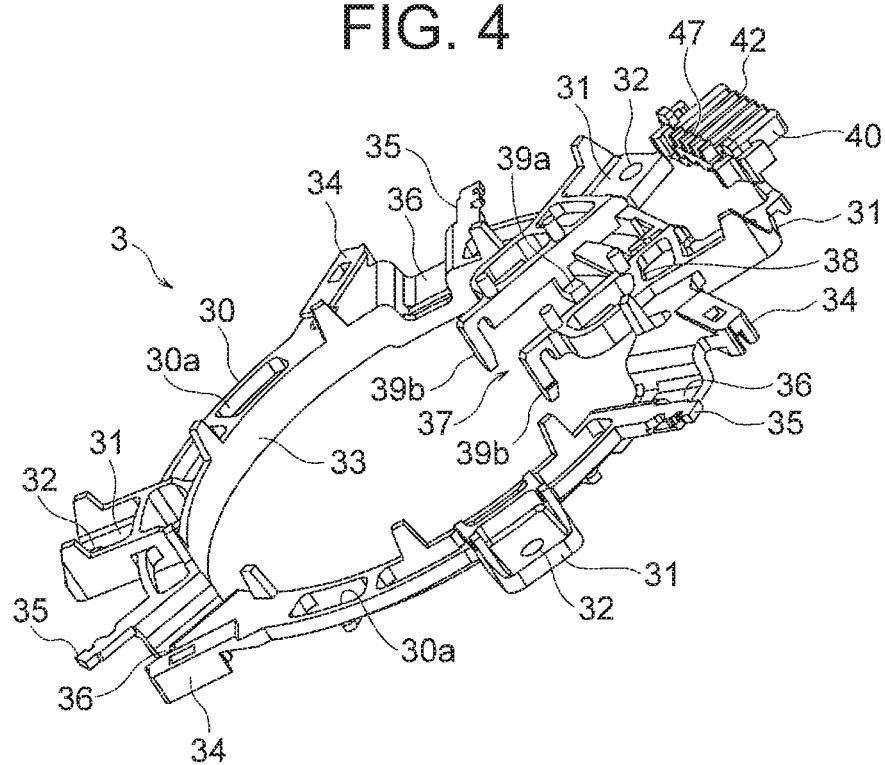
FIG. 4 is a perspective view of an annular plate portion of the lead wire wiring component of the first embodiment as viewed from a side opposite to the stator assembly.
Figure 5:
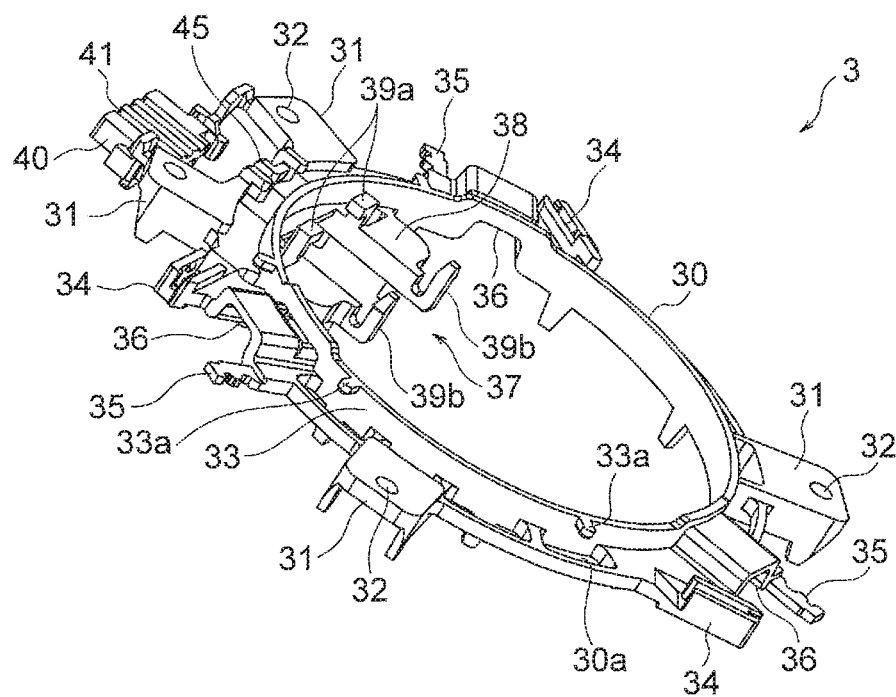
FIG. 5 is a perspective view of the annular plate portion of the lead wire wiring component of the first embodiment as viewed from the stator assembly side.

FIG. 4 is a perspective view of the annular plate portion 30 as viewed from the side opposite to the stator assembly 10. FIG. 5 is a perspective view of the annular plate portion 30 as viewed from the stator assembly 10 side. The annular plate portion 30 is a plate member having an annular shape, and has a plurality of openings 30a throughout an entire region of the annular plate portion 30 in the circumferential direction. Resin pieces 8 (resin chips) described later can be supplied to the stator assembly 10 through the openings 30a.

A lead-out portion 40 is provided at a position Ln the circumferential direction of the annular plate portion 30 and protrudes outward in a radial direction of the annular plate portion 30. An inner circumferential wall 33 along which the power lead wires 14 are drawn is provided along an inner circumferential edge of the annular plate portion 30. Positional displacement preventing pins 33a (FIG. 5) for preventing positional displacement of the power lead wires 14 are formed at a plurality of positions on the inner circumferential wall 33.

Covered terminal holding portions 34 for holding terminal portions of the power lead wires 14 are provided at a plurality of positions (three positions in this example) on the outer circumference of the annular plate portion 30, and the number of the positions corresponds to the number of the power lead wires 14. Moreover, core wire holding portions 35 are disposed apart from the corresponding covered terminal holding portions 34 in the circumferential direction of the annular plate portion 30.

The terminal portions of the power lead wires 14 (FIG. 3) are held by the covered terminal holding portions 34, and uncovered core wires of the power lead wires 14 are held by the core wire holding portions 35. When the lead wire wiring component 3 is attached to the stator assembly 10 as described later, the power terminals 23 of the stator assembly 10 (FIG. 1) are located between the covered terminal holding portions 34 and the core wire holding portions 35. The core wires of the power lead wires 14 held between the covered terminal holding portions 34 and the core wire holding portions 35 are joined to the power terminals 23 by spot welding or soldering. Thus, recesses 36 for leaving spaces for electrodes used in spot welding of the power terminals 23 and the core wires are provided between the covered terminal holding portions 34 and the core wire holding portions 35 of the annular plate portion 30.

A sensor hoard holding portion 37 for holding a sensor board (FIG. 3) is formed on a radially inner side of the lead-out portion 40 of the lead wire wiring component 3. The sensor board holding portion 37 is a portion protruding radially inward from the annular plate portion 30, and the sensor board 4 is held on an upper surface (a surface facing the stator assembly 10) of the sensor board holding portion 37 in FIG. 5.

The sensor board holding portion 37 includes a pair of board holding portions 38 (FIG. 5) extending in parallel with a plate surface of the annular plate portion 30. The pair of board holding portions 38 are disposed at a distance from each other in the circumferential direction of the annular plate portion 30. An assembly leg 39a and an assembly leg 39b are provided on each of the hoard holding portions 38. In the radial direction of the annular plate portion 30, the assembly leg 39a is disposed on a radially outer side and the assembly leg 39b is disposed on a radially inner side.

The sensor board 4 illustrated in FIG. 3 is a board on which electronic components such as a Hall integrated circuit (IC) are mounted and a sensor circuit for detecting a position of the rotor 7 is formed. The sensor board 4 includes a joint portion to be joined to the board-in connector 17 of the sensor lead wires 15.

The sensor board 4 has a cutout portion on an inner end portion of the sensor board 4 in the radial direction of the annular plate portion 30, and the cutout portion engages with the above described assembly leg 39a. The sensor board 4 also has a groove (not shown in the figure) on an outer end portion of the sensor board 4 in the radial direction of the annular plate portion 30, and the groove engages with the assembly leg 39b. The sensor board 4 contacts the board holding portions 38, engages with the assembly leas 39a and 39b, and is thereby held by the sensor board holding portion 37. Moreover, contact between the sensor board 4 and the board holding portions 38 prevents deformation of the sensor board 4 due to a pressure (a resin pressure) applied during molding described later.

Next, a structure of the lead-out portion 40 of the lead wire wiring component 3 will be described. The lead-out portion 40 is a portion protruding radially outward from the annular plate portion 30. Three power lead wire holding grooves 41 (FIG. 5) for holding the power lead wires 14 are formed on a surface of the lead-out portion 40 on the stator assembly 10 side.

Five sensor lead wire holding grooves 42 (FIG. 4) for holding the sensor lead wires 15 are formed on a surface of the lead-out portion 40 on a side opposite to the stator assembly 10. Four holding projections 47 are formed each between adjacent ones of the sensor lead wire holding grooves 42.

Figure 6:
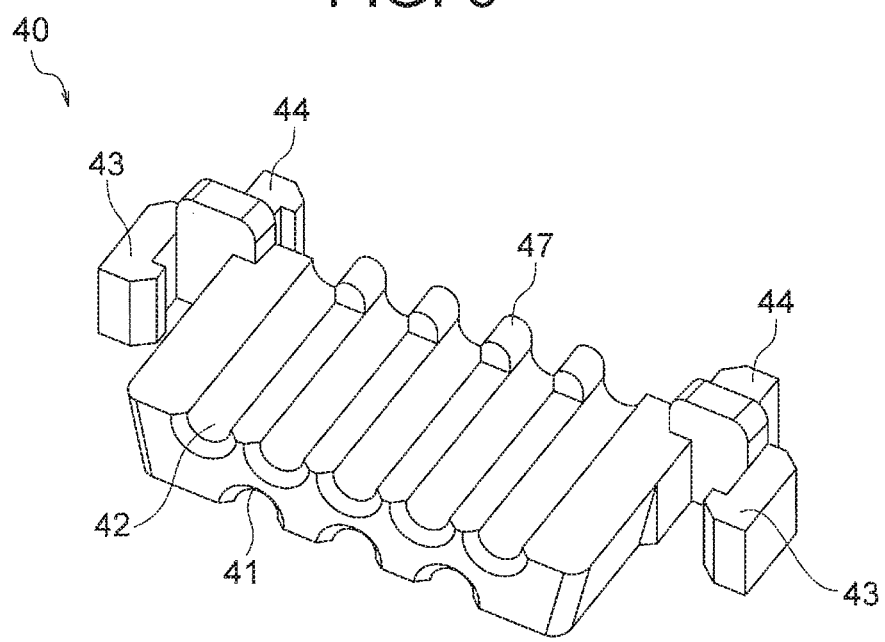
FIG. 6 is a perspective view illustrating a structure of a lead-out portion of the lead wire wiring component of the first embodiment.

FIG. 6 is a perspective view of the lead-out portion 40 of the lead wire wiring component 3 as viewed from the side opposite to the stator assembly 10. As illustrated in FIG. 6, a pair of first engaging portions 43 are formed to protrude from both sides of the lead-out portion 40 in a widthwise direction (i.e., both sides in the circumferential direction of the annular plate portion 30). The first engaging portions 43 extend outward in the radial direction of the annular plate portion 30. Attachment legs 63 (FIG. 8) of a sensor lead wire holding component 6 described later engage with the first engaging portions 43.

A pair of second engaging portions 44 are formed to protrude from both sides of the lead-out portion 40 at inner positions relative to the pair of first engaging portion 43 in the widthwise direction. The second engaging portions 44 extend inward in the radial direction of the annular plate portion 30. Attachment legs 53 (FIG. 7) of a power lead wire holding component 5 described later engage with the second engaging portions 44.

The power lead wire holding component 5 (FIG. 7) for holding the power lead wires 14 is attached to a side of the lead-out portion 40 on the stator assembly 10 side. Moreover, the sensor lead wire holding component 6 (FIG. 8) for holding the sensor lead wires 15 is attached to a side of the lead-out portion 40 opposite to the stator assembly 10.

Figure 7:
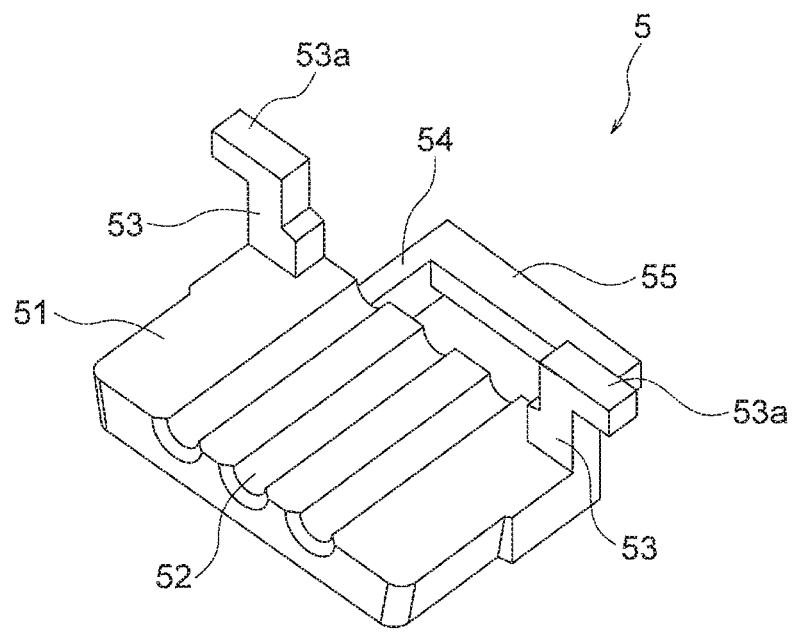
FIG. 7 is a perspective view illustrating a structure of a power lead wire holding component of the first embodiment.

FIG. 7 is a perspective view illustrating a shape of the power lead wire holding component 5. The power lead wire holding component 5 includes a plate-shaped base portion 51 on which three grooves 52 for holding the power lead wires 14 are formed, and a pair of attachment legs 53 protruding toward the lead wire wiring component 3 from both ends of the base portion 51 in the widthwise direction (i.e., both ends in the circumferential direction of the annular plate portion 30). Projections 53a are formed on the pair of attachment legs 53 to protrude in opposite directions. The attachment legs 53 are disposed at an inner end portion of the base portion 51 in the radial direction of the annular plate portion 30.

Moreover, a pair of ribs 54 extending further radially inward and an arm 55 connecting tips of the pair of ribs 54 are formed on an inner edge of the base portion 51 in the radial direction of the annular plate portion 30.

The attachment legs 53 of the power lead wire holding component 5 engage with the second engaging portions 44 (FIG. 6) of the lead out portion 40 from inside in the radial direction of the annular plate portion 30. In this manner, the power lead wire holding component 5 is attached to the lead-out portion 40. The power lead wires 14 (FIG. 3) are held between the power lead wire holding grooves 41 of the lead-out portion 40 and the grooves 52 of the power lead wire holding component 5. In this regard, the arm 55 (FIG. 7) of the power lead wire holding component 5 is provided for preventing detachment of the power lead wires 14.

As illustrated in FIG. 5, the annular plate portion 30 is provided with three folding pins 45 for folding the three power lead wires 14 drawn along the inner circumferential wall 33 from the lead-out portion 40. The three folding pins 45 are arranged in the circumferential direction of the annular plate portion 30. A projection for preventing positional displacement of the power lead wire 14 is formed at a tip of each of the folding pins 45.

The power lead wire 14 held by a center one of the three power lead wire holding grooves 41 of the lead-out portion 40 is folded by the center folding pin 45, is drawn along the inner circumferential wall 33, and is attached to the covered terminal holding portion 34 located at a position 180 degrees from the lead-out portion 40. The other two power lead wires 14 are folded by the corresponding folding pins 45, are drawn along the inner circumferential wall 33, and are attached to the two covered terminal holding portions 34 disposed on both sides of the lead-out portion 40 in the circumferential direction of the annular plate portion 30.

Figure 8:
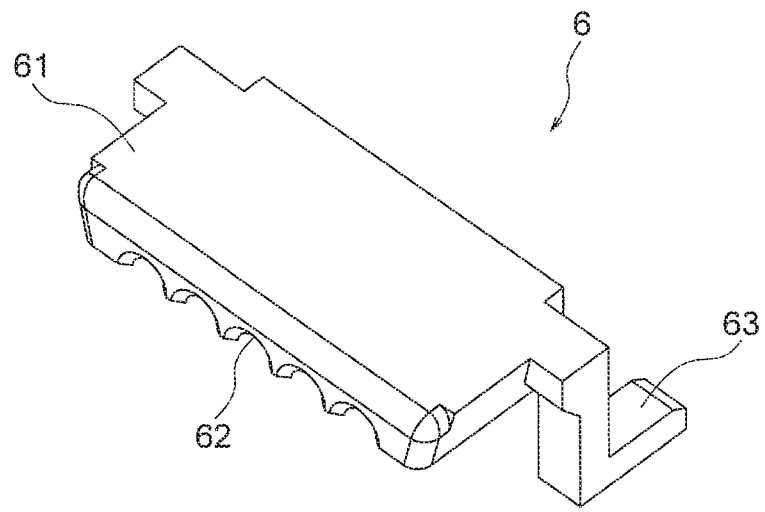
FIG. 8 is a perspective view illustrating a structure of a sensor lead wire holding component of the first embodiment.

FIG. 8 is a perspective view illustrating a shape of the sensor lead wire holding component 6. The sensor lead wire holding component 6 includes a plate-shaped base portion 61 on which five grooves 62 for holding the sensor lead wires 15 are formed, and a pair of attachment legs 63 protruding toward the lead wire wiring component 3 from both ends of the base portion 61 in the widthwise direction (i.e., the circumferential direction of the annular plate portion 30). Each of the attachment legs 63 has a tip extending inward in the radial direction of the annular plate portion 30.

The attachment legs 63 of the sensor lead wire holding component 6 engage with the first engaging portions 43 (FIG. 6) of the lead-out portion 40 from outside in the radial direction of the annular plate portion 30. In this manner, the sensor lead wire holding component 6 is attached to the lead-out portion 40. The sensor lead wires 15 (FIG. 3) are held between the sensor lead wire holding grooves 42 of the lead-out portion 40 and the grooves 62 of the sensor lead wire holding component 6. The sensor lead wires 15 are held-between the four holding projections 47 and between the holding projections 47 and the attachment legs (FIG. 7), and are drawn on a surface of the annular plate portion 30 opposite to a surface on which the power lead wires 14 are arranged.

The board-in connector 17 (FIG. 3) at the tips of the sensor lead wires 15 is joined by, for example, soldering to the joint portion of the sensor board 4 held by the sensor board holding portion 37. In this manner, the sensor circuit mounted on the sensor board 4 is connected to external equipment through the sensor lead wires 15.

Figure 9:
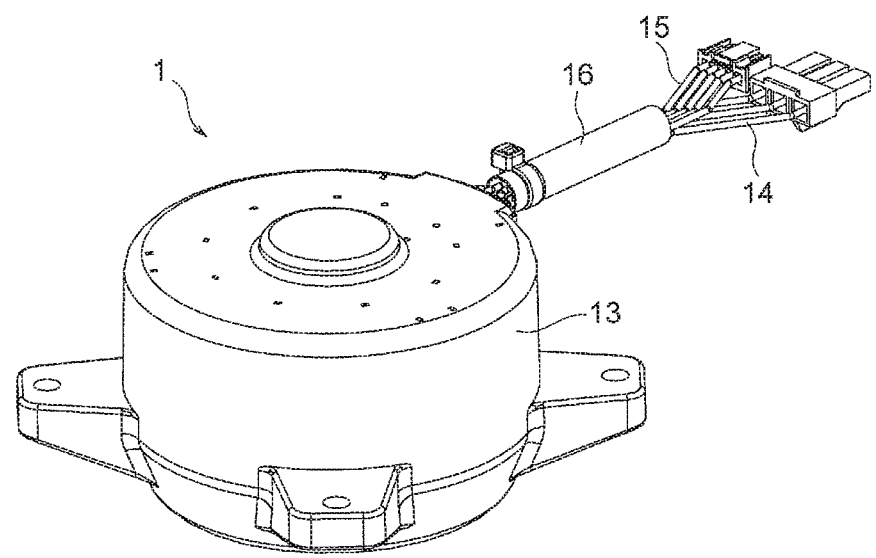
FIG. 9 is a perspective view illustrating a stator of the first embodiment.
Figure 10:
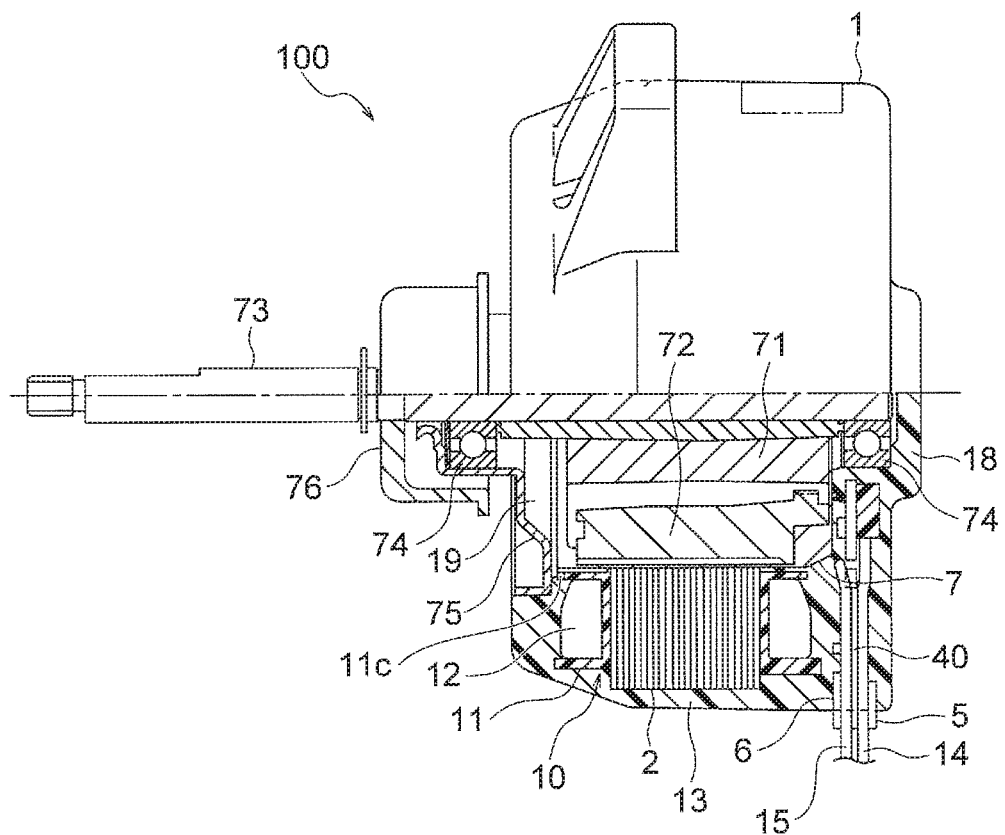
FIG. 10 is a partial sectional view illustrating a structure of a motor including the stator of the first embodiment.

Next, a molding resin 13 will be described. FIG. 9 is a perspective view illustrating the stator 1 (also referred to as a molded stator) in which the stator assembly 10 and the lead wire wiring component 3 are molded using the molding resin 13. FIG. 10 is a partial sectional view illustrating a motor 100 (also referred to as a molded motor) including the stator 1.

The molding resin 13 is a thermosetting resin such as a bulk molding compound (BMC). The molding resin 13 covers the stator assembly 10 from radially outside and from both sides in the axial direction in such a manner as to expose an inner circumferential surface of the stator assembly 10, i.e., the inner circumferential ends 22a of the teeth 22 illustrated in FIG. 2.

The molding resin 13 is injected into a cavity of a molding mold in which the stator 1 is placed, and is cured by heating. In order to reduce the amount of use of the molding resin, resin pieces 8 (resin chips) obtained by crushing a resin cured in a runner of the molding mold in the previous molding are used. The resin pieces 8 will be described later.

As illustrated in FIG. 10, in the axial direction of the stator assembly 10, an end portion 18 on a side to which the lead wire wiring component 3 is attached is covered with the molding resin 13. In this regard, a part of the lead-out portion 40, a part of the power lead wire holding component 5, and a part of the sensor lead wire holding component 6 are exposed. In the axial direction of the stator assembly 10, an opening 19 is formed on an end portion on a side opposite to the lead wire wiring component 3.

Next, the motor 100 of this embodiment will be described. As illustrated in FIG. 10, the motor 100 of this embodiment includes the stator 1 in which the stator assembly 10 and the lead wire wiring component 3 are integrally molded using the molding resin 13, and the rotor 7 rotatably inserted inside the stator 1. The rotor 7 is inserted through the opening 19 of the stator 1, and faces the inner circumferential ends 22a of the teeth 22 of the stator 1 (FIG. 2).

The rotor 7 includes a cylindrical rotor core 71 formed of a stack of electromagnetic steel sheets and a plurality of permanent magnets 72 buried in the rotor core 71. The permanent magnets 72 are arranged at equal intervals in the circumferential direction of the rotor core 71.

A shaft 73 serving as a rotating shaft is integrally attached to a center of the rotor core 71. The shaft 73 is supported by a pair of bearings 74. One of the bearings 74 is held by the molding resin 13 at the end portion 18 of the stator assembly 10. The other one of the bearings 74 is held by a bracket 75 provided in the opening 19 of the stator assembly 10.

Figure 11:
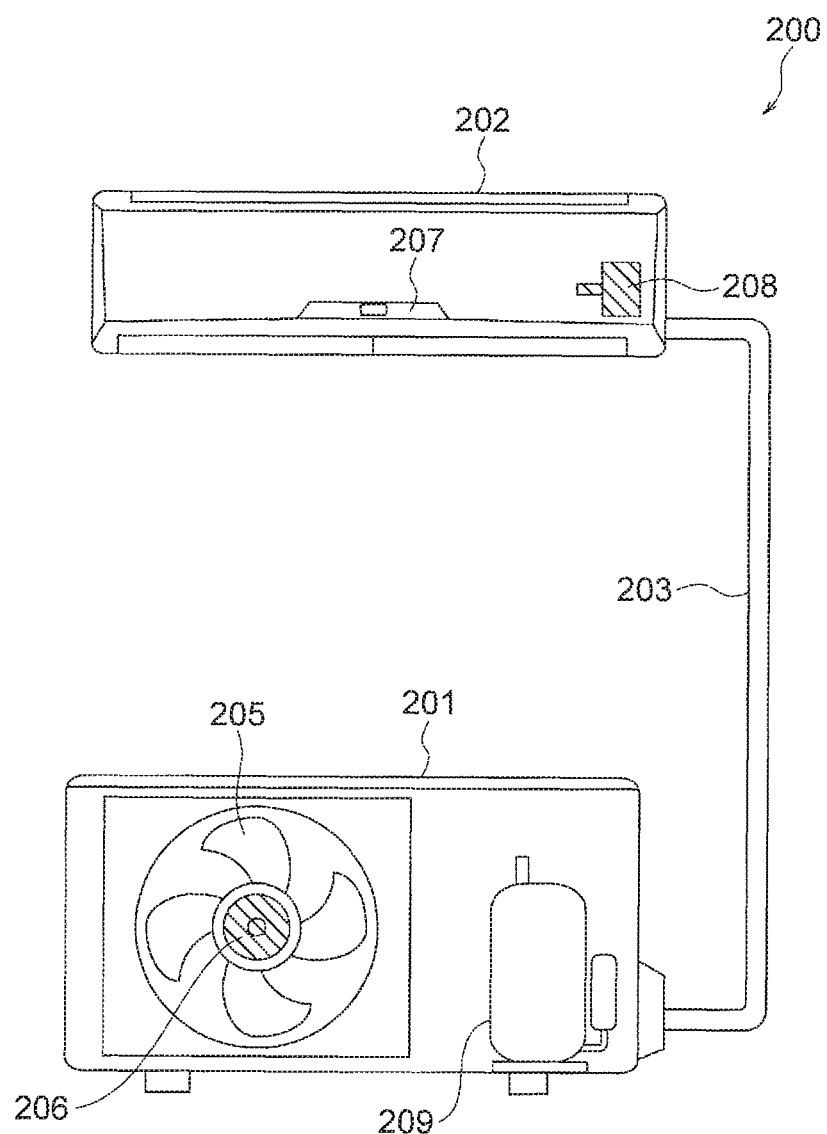
FIG. 11 is a view illustrating a structural example of an air conditioning apparatus including the motor of the first embodiment.

Next, an air conditioning apparatus 200 of this embodiment will be described. FIG. 11 is a view illustrating a structural example of the air conditioning apparatus 200 including the motor 100 of this embodiment. The air conditioning apparatus 200 includes an outdoor unit 201, an indoor unit 202, and a refrigerant pipe 203 connecting these units.

The outdoor unit 201 includes a first fan (blower) 205 and a first motor 206 for driving the first fan 205. The indoor unit 202 includes a second fan 207 and a second motor 208 for driving the second fan 207. At least one of the first motor 206 and the second motor 208 is constituted by the motor 100 of this embodiment. In this regard, FIG. 11 also illustrates a compressor 209 for compressing refrigerant in the outdoor unit 201.

Figure 12:
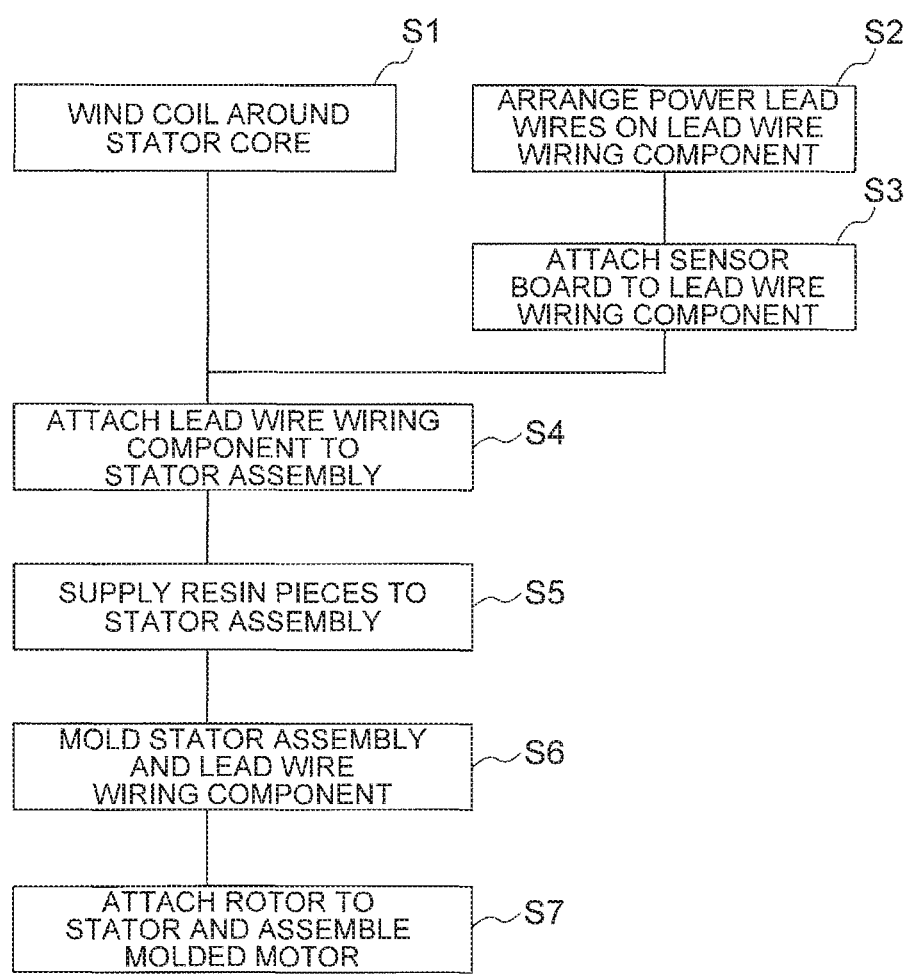
FIG. 12 is a flowchart for describing a manufacturing process of the stator of the first embodiment.

Next, a method of manufacturing the stator 1 will be described. FIG. 12 is a flowchart for describing a method of manufacturing the stator 1 of the first embodiment.

First, an insulating portion 11 is formed by molding a thermoplastic resin integrally with the stator core 2 formed of a stack of electromagnetic steel sheets, or by attaching a previously molded thermoplastic resin to the stator core 2. In addition, the coil 12 is wound around the teeth 22 of the stator core 2 via the insulating portion 11, and thereby the stator assembly 10 illustrated in FIG. 1 is manufactured (step S1). For example, the first winding portion 121 and the second winding portion 122 of the coil 12 (FIG. 1) are respectively wound around the first tooth 221 and the second tooth 222 illustrated in FIG.

Concurrently with step S1, arrangement of the power lead wires 14 on the lead wire wiring component 3 (step S2) and attachment of the sensor board 4 to the lead wire wiring component 3 (step S3) are performed.

Specifically, three power lead wires 14 are disposed on the lead-out portion 40 of the lead wire wiring component 3, are drawn along the inner circumferential wall 33 of the lead wire wiring component 3, and are attached to the corresponding covered terminal holding portions 34. In addition, uncovered terminal portions of the power lead wires 14 are attached to the corresponding core wire holding portions 35. Then, the power lead wire holding component 5 is attached to the lead-out portion 40 (step S2).

Then, the sensor board 4 is attached to the lead wire wiring component 3, the sensor lead wires 15 are disposed on the lead-out portion 40, and the board-in connector 17 of the sensor lead wires 15 is joined to the joint portion of the sensor board 4 by soldering. Then, the sensor lead wire holding component 6 is attached to the lead-out portion 40 (step S3).

Steps S2 and S3 may be performed before, after or at the same time as step S1 described above.

Figure 13:
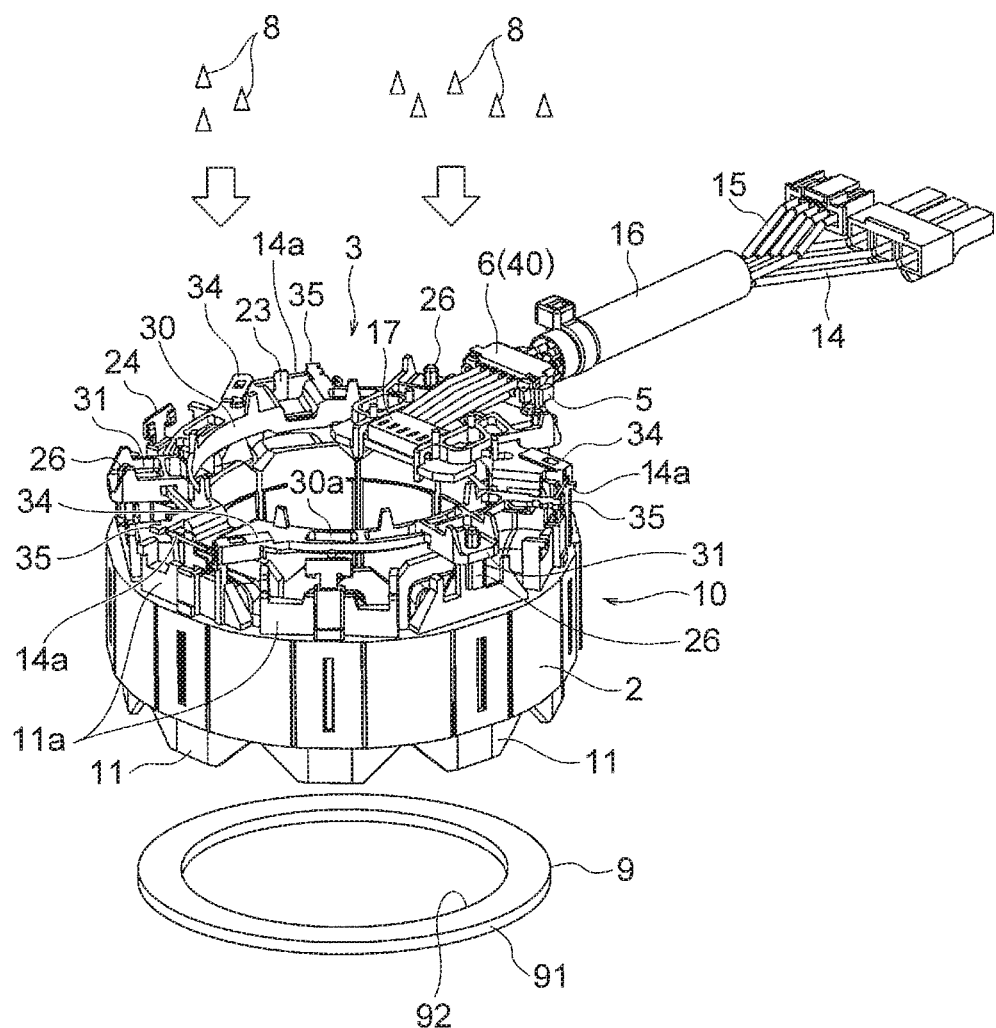
FIG. 13 is a perspective view for describing a process of supplying resin pieces (resin chips) to the stator assembly in the first embodiment.

Subsequently, the lead wire wiring component 3 is attached to the stator assembly 10 (step S4). FIG. 13 is a perspective view illustrating a state in which the lead wire wiring component 3 is attached to the stator assembly 10. The leg portions 31 of the lead wire wiring component 3 contact the upper surface of the outer wall portion 11a of the stator assembly 10, and the pins 26 of the stator assembly 10 engage with the holes 32 of the leg portions 31. In addition, the pins 26 are thermally welded to the leg portions 31. The core wires of the power lead wires 14 arranged on the lead wire wiring component 3 are spot-welded to the power terminals 23 of the stator assembly 10.

Figure 14:
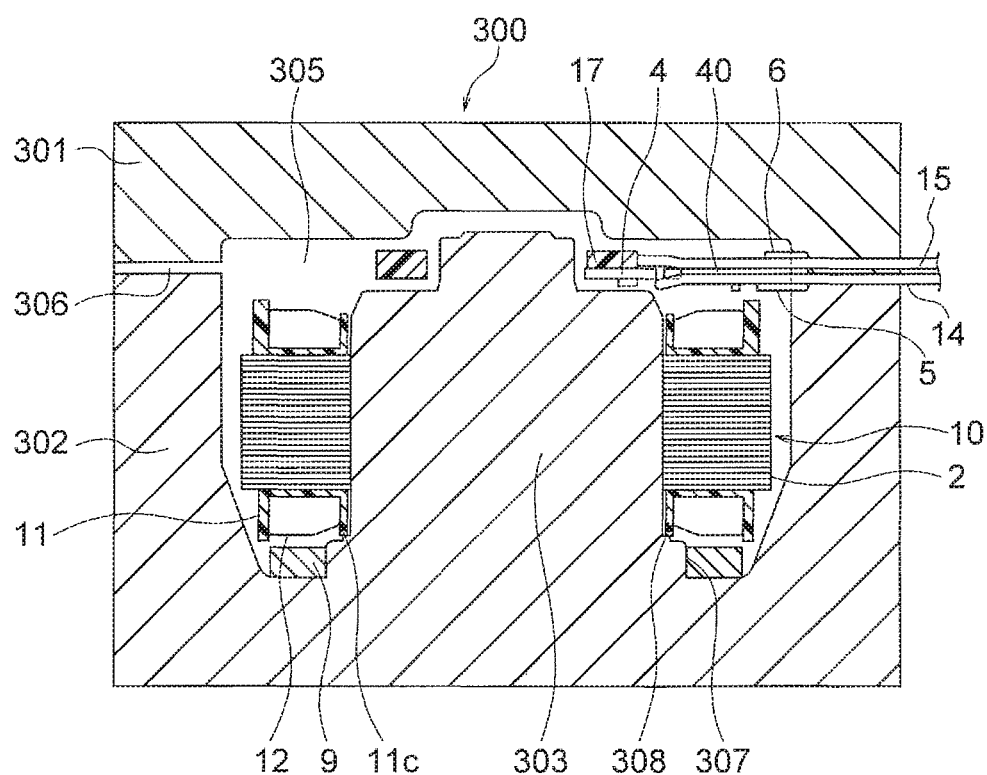
FIG. 14 is a schematic view illustrating a basic structure of a molding mold of the first embodiment.

Then, the stator assembly 10 is placed in a cavity 305 of a molding mold 300 (FIG. 14). Then, as schematically illustrated in FIG. 13, resin pieces 8 are supplied to the stator assembly 10 (particularly, gaps between adjacent winding portions 12a of the coil 12) (step S5). A structure of the molding mold 300 will be described later.

The resin pieces 8 are obtained by crushing a resin cured in the runner of the molding mold in a previous molding step. The resin pieces 8 are formed of the crushed molding resin 13. In this regard, during a process in which the resin pieces 8 are formed by crushing the resin cured in the runner of the molding mold, a material other than the molding resin 13 may be added. A material which is not intentionally added may be contained during the process. Accordingly, more specifically, a material of which the resin pieces 8 are composed includes a material (for example, a thermosetting resin such as BMC) of which the molding resin 13 is composed.

As described above, the winding portions 12a of the coil 12 are wound around the teeth 22 of the stator core 2. The resin pieces 8 are supplied to the entire stator assembly 10 from above, and are particularly supplied to gaps between the adjacent winding portions 12a of the coil 12. For example, the resin pieces 8 are supplied to a gap between the first winding portion 121 and the second winding portion 122 illustrated in FIG. 1.

A size of the resin piece 8 is smaller than the gap between the adjacent winding portions 12a of the coil 12. A solid of a resin whose size is smaller than the gap between the winding portions 12a will be referred to as a "resin chip". With this structure, the resin piece 8 can enter into the gap between the winding portions 12a.

In FIG. 13, the resin pieces 8 are illustrated as triangles for convenience of illustration. However, a shape of the resin piece 8 is not limited to a specific shape as long as a shape of the resin piece 8 allows the resin piece 8 to enter into the gap between the winding portions 12a. Moreover, the resin pieces 8 may be, for example, powdery. When the resin pieces 8 are powdery, it is ensured that the resin pieces 8 enter into the gap between the winding portions 12a even if the gap between the winding portions 12a has a complicated structure. Thus, the amount of use of the molding resin can be reduced, as compared with a case where larger resin lumps are used.

The lead wire wiring component 3 attached to the stator assembly 10 has a large number of openings 30a in the entire region of the annular plate portion 30 in the circumferential direction, and thus the resin pieces 8 can be supplied to the stator assembly 10 through the openings 30a. The opening 30a has a size that allows the resin piece 8 to pass therethrough.

In this regard, the resin pieces 8 may be supplied to the stator assembly 10 before the lead wire wiring component 3 is attached to the stator assembly 10. In this case, it is not necessary to provide the openings 30a on the lead wire wiring component 3.

A piece receiving portion 9 (a receiving portion) is provided below the stator assembly 10. The piece receiving portion 9 is provided for preventing positional displacement of the resin pieces 8, i.e., falling down of the resin pieces 8 through the gaps between the winding portions 12a. The piece receiving portion 9 has an annular shape so as to cover a lower end of the stator assembly 10. The piece receiving portion 9 is placed in the cavity of the molding mold before the stator assembly 10 is placed therein.

In this regard, the piece receiving portion 9 is not limited to the annular shape. It is sufficient that the piece receiving portion 9 prevents falling down (positional displacement) of the resin pieces 8 through the gaps between the winding portions 12a, and to have an area larger than that of the lower ends of the gaps between the winding portions 12a. Moreover, it is also possible to provide the piece receiving portions 9 of the same number as the number of gap between the winding portions 12a.

The piece receiving portion 9 may be composed of, for example, a resin. In this case, through a molding step described later, the piece receiving portion 9 constitutes a part of a resin portion of the stator 1. The resin of which the piece receiving portion 9 is composed may be identical with or different from a material of which the molding resin 13 is composed.

In this example, the stator assembly 10 is placed in the molding mold 300, and then the resin pieces 8 are supplied to the stator assembly 10. However, supply of the resin pieces 8 may be performed before the stator assembly 10 is placed in the molding mold 300. In this case, it is necessary to carry the stator assembly 10 and the piece receiving portion 9 together to the molding mold 300 after the supply of resin pieces 8. Thus, the piece receiving portion 9 preferably has an engaging portion engaged with the stator assembly 10.

For example, an outer circumferential edge 91 and an inner circumferential edge 92 of the piece receiving portion 9 may be fitted to the outer wall portion 11a and the inner wall portion 11b of the insulating portion 11. In this case, the outer circumferential edge 91 and the inner circumferential edge 92 of the piece receiving portion 9 serve as the engaging portions. The piece receiving portion 9 may be provided with a hook-shaped engaging portion so that the engaging portion is engaged with the stator core 2.

After the resin pieces 8 are supplied in this manner, the molding step of integrally molding the stator assembly 10 using the molding resin is performed (step S6 in FIG. 12).

FIG. 14 is a schematic view for describing a structure of the molding mold 300 used for molding. The molding mold 300 includes an upper mold 301 and a lower mold 302 that are openable and closable, and a cavity 305 is formed between the upper and lower molds 301 and 302. A runner 306 that is a channel for injecting a resin into the cavity 305 is formed between the upper mold 301 and the lower mold 302. The runner 306 leads to an upper end portion of the cavity 305. In this regard, the resin pieces 8 supplied to the stator assembly 10 are omitted in FIG. 14.

In the lower mold 302, a cylindrical center core 303 is formed to protrude into the cavity 305. The center core 303 is a portion that engages with an inner side of the stator assembly 10. A step portion 308 is formed on the center core 303, and the step portion 308 protrudes radially outward from an outer circumferential surface of the center core 303. A larger-diameter portion 307 is formed on a lower end portion of the center core 303, and the larger-diameter portion 307 further protrudes radially outward from the step portion 308. The larger-diameter portion 307 is a portion corresponding to the opening 19 (FIG. 10) of the stator 1.

The step portion 308 contacts the projections 11c formed on a lower end portion of the inner wall portion 11b (FIG. 1) of the stator assembly 10, and supports the stator assembly 10. With this structure in which the stator assembly 10 is supported from radially inside, the stator assembly 10 need not be supported from radially outside. Thus, the stator assembly 10 can be completely covered with the molding resin 13 from radially outside. In other words, an interface between the stator core 2 (or the insulating portion 11) and the molding resin 13 is prevented from being exposed to an outer side of the stator 1. Accordingly, moisture or the like is prevented from entering into the stator 1, and quality of the stator 1 is enhanced.

In this example, the projections 11c of the stator assembly 10 are supported by the step portion 308. Instead of providing the step portion 308, it is also possible to provide, for example, a plurality of claws protruding radially outward from the outer circumferential surface of the center core 303. Alternatively, it is also possible to provide a plurality of projections on an upper surface of the larger-diameter portion 307 so that the projections are not connected to the center core 303. In the latter case (i.e., the case where the plurality of projections which are not connected to the center core 303 are provided on the upper surface of the larger-diameter portion 307), the molding resin enters into an inner circumferential side of the insulating portion 11 to reach the outer circumferential surface of the center core 303. Thus, for example, the interface between the insulating portion 11 and the molding resin is prevented from being exposed to an inner side of the stator 1. Thus, the effect of preventing moisture or the like from entering into the stator 1 is further enhanced.

In a state where the upper mold 301 is moved upward to open the cavity 305, the stator assembly 10 is placed in the cavity 305 as described above, and the resin pieces 8 are supplied to the stator assembly 10 (particularly, the gaps between adjacent winding portions 12a of the coil 12). In this regard, a part of the lead-out portion 40 of the lead wire wiring component 3, a part of the power lead wire holding component 5, and a part of the sensor lead wire holding component 6 protrude outside of the cavity 305.

Thereafter, the upper mold 301 is moved downward to close the cavity 305, and the molding resin in smelted state is injected into the cavity 305 from the runner 306. The molding resin injected into the cavity 305 covers the stator assembly 10 and the lead wire wiring component 3. The molding resin also enters into between the winding portions 12a of the coil 12 and between the resin pieces 8 supplied to the stator assembly 10.

As described above, since the resin pieces 8 are supplied to the gaps between the winding portions 12a of the coil 12 of the stator assembly 10, an amount of the molding resin injected from the runner 306 is small.

After the molding resin is injected into the cavity 305, the molding mold 300 is heated. Accordingly, the molding resin in the cavity 305 is cured. That is, the stator assembly 10 and the lead wire wiring component 3 are integrally molded using the molding resin, and thereby the stator 1 is formed. Moreover, the resin pieces 8 are integrated with the molding resin.

After the molding step is completed, the stator 1 is taken out from the molding mold 300. Thus, manufacturing of the stator 1 of this embodiment is completed. At this time, the resin cured in the runner 306 of the molding mold 300 is taken out and crushed, and is used as the resin pieces 8 in the molding step the next stator 1.

After the stator 1 is manufactured as described above, the motor 100 is assembled (step S7). That is, as illustrated in FIG. 10, the shaft 73 to which the rotor 7 and the bearings 74 are attached is inserted into the stator 1 through the opening 19. Moreover, the bracket 75 is attached to the opening 19 of the stator 1. In addition, a waterproof cap 76 for preventing water or the like from entering into the bearings 74 is attached to an outer side of the bracket 75. Thus, manufacturing of the motor 100 is completed.

In this regard, the resin pieces 8 are most preferably formed of a material of which the molding resin 13 is composed, but may be formed of a material including the material of which the molding resin 13 is composed (i.e., the material with addition of another material). Moreover, the resin pieces 8 may also be formed of a material different from the material of which the molding resin 13 is composed. The resin pieces 8 are preferably obtained by crushing the resin taken out from the runner 306 of the molding mold 300 in the previous molding step, but are not limited to this example.

As described above, in the first embodiment of the present invention, the resin piece 8 (the resin chip) is disposed in the gap between the winding portions 12a (the first winding portion 121 and the second winding portion 122) wound around adjacent teeth 22 (the first tooth 221 and the second tooth 222) of the stator core 2. Therefore, the amount of use of the molding resin can be reduced, and manufacturing cost of the stator 1 can be reduced.

Moreover, since the resin piece 8 includes a material of which the molding resin 13 is composed, the resin piece 8 is integrated with the molding resin 13, and the uniform molding resin 13 can be obtained. Thus, quality of the stator can be enhanced.

Moreover, since the resin cured in the runner 306 of the molding mold 300 in the previous molding step (in other words, the molding step already performed) and crushed is used as the resin piece 8, manufacturing cost can be further reduced by reuse of the resin.

Moreover, since the lead wire wiring component 3 is provided with the opening 30a having a size that allow the resin piece 8 to pass therethrough, the resin piece 8 can be easily supplied to the stator assembly 10 after the lead wire wiring component 3 is attached to the stator assembly 10.

Moreover, in the first embodiment of the present invention, the stator 1 is manufactured through the step of preparing the stator core 2 including the adjacent teeth 22 (the first tooth. 221 and the second tooth 222), the step of winding the winding portions 12a (the first winding portion 121 and the second winding portion 122) of the coil 12 around the teeth 22, the step of supplying the resin piece 8 to the gap between the winding portions 12a, and the step of integrally molding the stator core 2, the coil 12, and the resin piece 8 using the molding resin. Since the resin piece 8 is supplied to the gap between the winding portions 12a and then integral molding is performed using the molding resin 13 in this manner, the amount of use of the molding resin can be reduced, and thereby manufacturing cost of the stator 1 can be reduced. Moreover, the amount of supply of the resin pieces 8 can be adjusted in accordance with a width of the gap between the winding portions 12a, and thus this technique is applicable to various types of the stator 1.

Moreover, since the piece receiving portion 9 is provided below the stator core 2, positional displacement of the resin pieces 8 can be prevented. Thus, decrease in strength due to non-uniform resin distribution in the stator 1 can be prevented, and quality of the stator 1 can be enhanced.

Moreover, since the piece receiving portion 9 includes the engaging portion (for example, the outer circumferential edge 91 and the inner circumferential edge 92) engaged with the stator core 2, positional displacement of the resin pieces 8 is prevented when the stator assembly 10 with the resin pieces 8 supplied thereto is moved. Thus, quality of the stator 1 can be enhanced.

Moreover, since the resin piece 8 is supplied to the stator assembly 10 after the lead wire wiring component 3 is attached to the stator assembly 10, the supply of the resin piece 8 can be performed in a state where, for example, the stator assembly 10 is placed in the molding mold 300. Thus, the manufacturing process can be simplified.

Moreover, since the manufacturing cost of the stator 1 is reduced as described above, manufacturing cost of the motor 100 including the stator 1 can be reduced.

Further, since the manufacturing cost of the stator 1 is reduced as described above, manufacturing cost of the air conditioning apparatus 200 using the motor 100 including the stator 1 can be reduced.

Second Embodiment

Next, a second embodiment of the present invention will be described. The second embodiment is intended to further simplify the manufacturing process and enhance quality of the stator 1 in addition to reduction of the amount of use of the molding resin.

Figure 15:
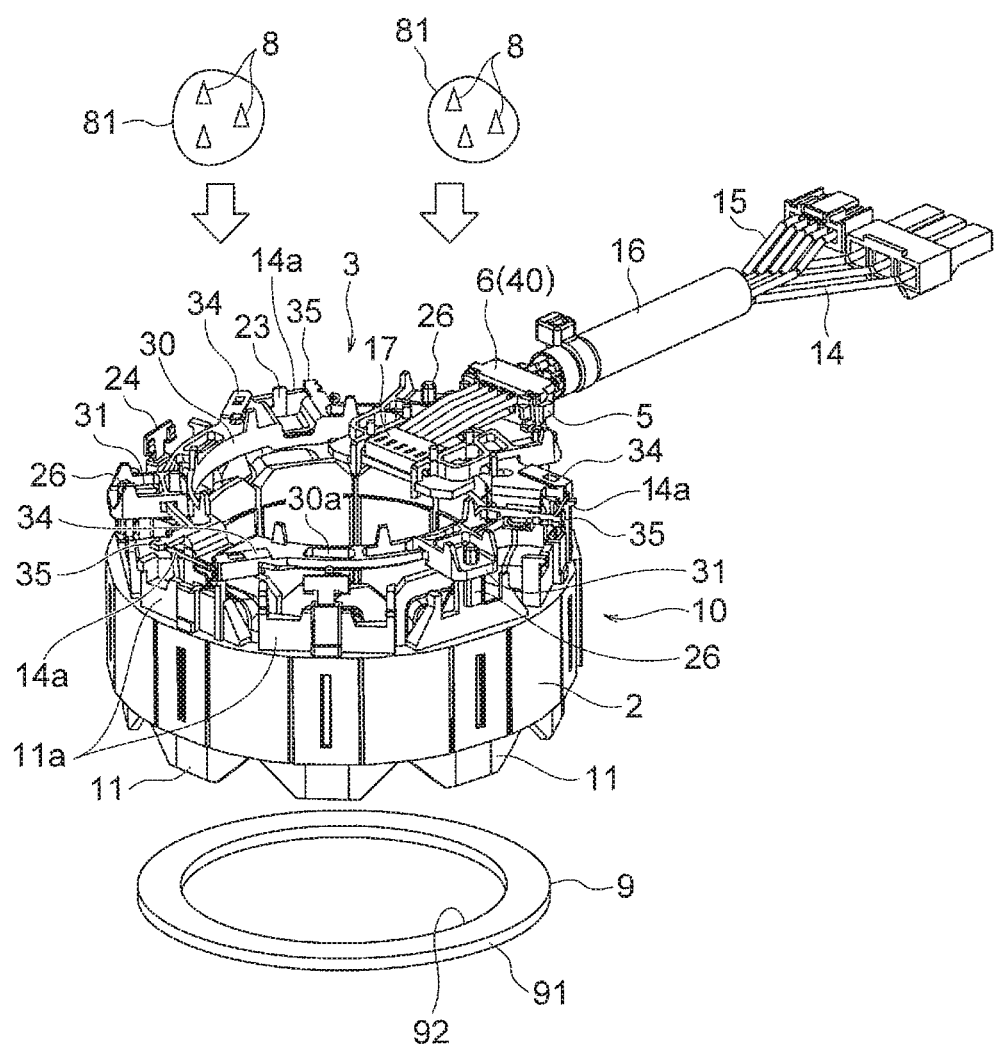
FIG. 15 is a perspective view for describing a process of supplying resin pieces to a stator assembly in a second embodiment of the present invention.

FIG. 15 is a perspective view for describing a process of supplying the resin pieces 8 to the stator assembly 10 in the second embodiment. As described in the first embodiment, in a state where the stator assembly 10 is placed in the molding mold 300 (FIG. 14), the resin pieces 8 are supplied to the stator assembly 10 (particularly, between the adjacent winding portions 12a of the coil 12). In this regard, the stator assembly 10 may be placed in the molding mold 300 after the resin pieces 8 are supplied to the stator assembly 10. The piece receiving portion 9 is placed below the stator assembly 10.

In the second embodiment, a temporarily molded body 81 obtained by lumping a plurality of resin pieces 8 (resin chips) using an additional resin is used. The resin for lumping the resin pieces 8 is, for example, a repairing material for the molding resin 13 or a binder resin. The temporarily molded body 81 is preferably, for example, a clay-like lump.

Since the resin pieces 8 are lumped using the resin to become the temporarily molded body 81, positions of the resin pieces 8 relative to the stator assembly 10 can be fixed. Thus, decrease in strength due to non-uniform resin distribution in the stator 1 can be reduced, and quality of the stator 1 can be enhanced.

Moreover, the plurality of resin pieces 8 can be handled all at once, and thereby operation is simplified. In this regard, although FIG. 15 illustrates an example in which each temporarily molded body 81 includes three resin pieces 8 lumped using the resin, the number of the resin pieces 8 included in each temporarily molded body 81 is not limited to a specific number.

It is preferable that the temporarily molded body 81 is deformable under an external force. Moreover, it is sufficient that the temporarily molded body 81 has a size and a shape so that the temporarily molded body 81 can enter into the gap between the adjacent winding portions 12a of the coil 12. A size of the opening 30a of the lead wire wiring component 3 attached to the stator assembly 10 is larger than that of the temporarily molded body 81.

As described in the first embodiment, the resin pieces 8 are preferably formed of a material of which the molding resin 13 is composed, but may be formed of a material including the material of which the molding resin 13 is composed (i.e., the material with addition of another material). Moreover, the resin pieces 8 may also be formed of a material different from the material of which the molding resin 13 is composed. Moreover, the resin pieces 8 are preferably obtained by crushing the resin cured in the runner of the molding mold in the previous molding step, but are not limited to this example.

After the temporarily molded body 81 is supplied to the stator assembly 10 in this manner, the molding resin is injected into the molding mold 300 and the molding mold 300 is heated. Accordingly, the stator assembly 10 and the lead wire wiring component 3 are integrally molded using the molding resin, and thereby the stator illustrated in FIG. 9 is obtained. This molding step is as described in the first embodiment.

At this time, the resin pieces 8 included in the temporarily molded body 81 are integrated with the molding resin 13. Moreover, the resin (the repairing material for the molding resin or the binder resin) used for lumping the resin pieces 8 in the temporarily molded body 81 is a resin that can coexist with the molding resin, and a change in properties is less likely to occur. In this regard, the temporarily molded body 81 may be formed by compressing the plurality of resin pieces 8 without using the resin.

The structure of the stator 1 of the second embodiment is similar to that of the stator 1 described in the first embodiment, except for the use of the temporarily molded body 81 obtained by lumping the resin pieces 8 with the resin. The structures of a motor and an air conditioning apparatus using the stator 1 of the second embodiment are similar to those of the motor 100 and the air conditioning apparatus 200 described in the first embodiment.

As described above, in the second embodiment of the present invention, the temporarily molded body 81 including the resin pieces 8 (the resin chips) lumped using the resin is supplied to the gap between the winding portions 12a of the coil 12, and therefore the positions of the resin pieces 8 relative to the stator assembly 10 can be fixed. Thus, in addition to the advantages of the first embodiment, decrease in strength due to non-uniform resin distribution in the stator 1 can be prevented, and thereby quality of the stator 1 can be enhanced.

Moreover, since the resin for lumping the resin pieces 8 is the repairing material for the molding resin or the binder resin, a change in properties is less likely to occur when the resin coexists with the molding resin. Thus, quality of the stator 1 can be enhanced.

In this regard, although the piece receiving portion 9 is used in this example, it is not necessary to use the piece receiving portion 9. This is because, for example, when the temporarily molded body 81 including the resin pieces 8 lumped using the resin or the like is used, falling down of the temporarily molded body 81 through the gap between the winding portions 12a is prevented.

Moreover, when the resin pieces 8 which are not temporarily molded are supplied to the gaps between the winding portions 12a as described in the first embodiment, uniformity of resin distribution may decrease as compared with the second embodiment, but the advantage of reducing the amount of use of the molding resin can be sufficiently obtained.

DESCRIPTION OF REFERENCE SIGNS

1, 1A: stator, 2: stator core, 3: lead wire wiring component (wiring component), 4: sensor board, 5: power lead wire holding component, 6: sensor lead wire holding component, 7: rotor, 8: resin piece (resin chip), 9: piece receiving portion (receiving portion), 10: stator assembly, 11: insulating portion, 11a: outer wall portion, 11b: inner wall portion, 12: coil, 12a: winding portion, 121: first winding portion, 12: second winding portion, 13: molding resin, 14: power lead wire, 15: sensor lead wire, 21: yoke, 22: tooth, 221: first tooth, 222: second tooth, 30: annular plate portion, 30a: opening, 40: lead-out portion, 71: rotor core, 72: permanent magnet, 73: shaft, 74: hearing, 81: temporarily molded body, 91: outer circumferential edge, 92: inner circumferential edge, 100: motor, 200: air conditioning apparatus, 201: outdoor unit, 202: indoor unit, 203: refrigerant pipe, 205: first fan, 206: first motor, 207: second fan, 208: second motor, 300: molding mold, 301: upper mold, 302: lower mold, 303: center core, 305: cavity, 306: runner.

What is claimed is:

1. A stator comprising:
   a stator core having a first tooth and a second tooth adjacent to each other;
   a coil having a first winding portion wound around the first tooth and a second winding portion wound around the second tooth;
   a resin chip disposed in in a gap between the first winding portion and the second winding portion;
   a molding resin covering the stator core, the coil and the resin chip, and
   a wiring component on which a lead wire is wired, the wiring component being attached to the stator core,
   wherein the wiring component has an opening having a size allowing the resin chip to pass therethrough.

2. The stator according to claim 1, wherein the resin chip has a material of which the molding resin is composed.

3. The stator according to claim 1 or 2, wherein the resin chip is obtained by crushing a resin cured in a runner of a mold in a molding step of the stator which is previously performed.

4. The stator according to claim 1, wherein the resin chip has a plurality of resin chips lumped using a resin.

5. The stator according to claim 4, wherein the resin for lumping the plurality of resin chips is a repairing material for the molding resin or a binder resin.

6. The stator according to claim 1, wherein a receiving portion to receive the resin chip is attached to the stator core on a side opposite to the wiring component.

7. The stator according to claim 6, wherein the receiving portion has an engaging portion engaged with the stator core.

8. A motor comprising a stator and a rotor disposed in inside the stator, the stator comprising:
   a stator core having a first tooth and a second tooth adjacent to each other;
   a coil having a first winding portion wound around the first tooth and a second winding portion wound around the second tooth;
   a resin chip disposed in in a gap between the first winding portion and the second winding portion;
   a molding resin covering the stator core, the coil and the resin chip, and
   a wiring component on which a lead wire is wired, the wiring component being attached to the stator core,
   wherein the wiring component has an opening having a size allowing the resin chip to pass therethrough.

9. The motor according to claim 8, wherein the resin chip has a material of which the molding resin is composed.

10. An air conditioning apparatus comprising:
    an outdoor unit having a first fan and a first motor to drive the first fan;
    an indoor unit having a second fan and a second motor to drive the second fan, and
    a refrigerant pipe connecting the outdoor unit and the indoor unit,
    wherein at least one of the first motor and the second motor comprises a stator and a rotor disposed in inside the stator,
    wherein the stator comprises:
    a stator core having a first tooth and a second tooth adjacent to each other;

a coil having a first winding portion wound around the first tooth and a second winding portion wound around the second tooth;

a resin chip disposed in in a gap between the first winding portion and the second winding portion; and a molding resin covering the stator core, the coil and the resin chip, and a wiring component on which a lead wire is wired, the wiring component being attached to the stator core, wherein the wiring component has an opening having a size allowing the resin chip to pass therethrough.

11. The air conditioning apparatus according to claim 10, wherein the resin chip has a material of which the molding resin is composed.

12. A method of manufacturing a stator, the method comprising the steps of:

preparing a stator core having a first tooth and a second tooth adjacent to each other;

winding a first winding portion of a coil around the first tooth and winding a second winding portion of the coil around the second tooth;

attaching a wiring component on which a lead wire is wired to the stator core;

supplying a resin chip into a gap between the first winding portion and the second winding portion, and integrally molding the stator core, the coil and the resin chip using a molding resin, wherein the wiring component has an opening having a size allowing the resin chip to pass therethrough.

13. The method of manufacturing the stator according to claim 12, wherein the resin chip has a material of which the molding resin is composed.

14. The method of manufacturing the stator according to claim 12, wherein the resin chip is obtained by crushing a resin cured in a runner of a mold in the molding step which is previously performed.

15. The method of manufacturing the stator according to claim 12, wherein a receiving portion to receive the resin chip is provided below the stator core.

16. The method of manufacturing the stator according to claim 15, wherein the receiving portion has an engaging portion engaged with the stator core.

* * * * *